United States Patent
Burlage et al.

[19]

[11] Patent Number: 6,089,553

[45] Date of Patent: Jul. 18, 2000

[54] RESILIENT BEARING, IN PARTICULAR FOR MOUNTING AN ENGINE IN A MOTOR VEHICLE

[75] Inventors: Thomas Burlage, Wallenhorst; Klaus Giesen, Damme, both of Germany

[73] Assignee: BASF Aktiengesellschaft, Ludwigshafen, Germany

[21] Appl. No.: 08/904,692

[22] Filed: Aug. 1, 1997

[30] Foreign Application Priority Data

Aug. 14, 1996 [DE] Germany .......................... 196 32 771

[51] Int. Cl.⁷ .................. F16F 1/44; F16F 1/36; F16F 5/00; B60G 11/22
[52] U.S. Cl. .................... 267/293; 267/153; 267/140.12
[58] Field of Search .................... 267/140.11, 140.13, 267/140.12, 141.2, 153, 293

[56] References Cited

U.S. PATENT DOCUMENTS

| | | | |
|---|---|---|---|
| 4,770,398 | 9/1988 | Lee | 267/293 |
| 5,290,018 | 3/1994 | Watanabe et al. | 267/293 |
| 5,549,283 | 8/1996 | Bellamy et al. | 267/293 |

FOREIGN PATENT DOCUMENTS

| | | | |
|---|---|---|---|
| 0300093 | 1/1989 | European Pat. Off. | 267/293 |
| 0072747 | 4/1983 | Japan | 267/293 |

Primary Examiner—Christopher P. Schwartz
Assistant Examiner—Robert A. Siconolfi
Attorney, Agent, or Firm—Keil & Weinkauf

[57] ABSTRACT

Proposed for mounting an engine in a motor vehicle is a resilient bearing which comprises a rigid casing (1) for connection to, for example, the body, a rigid inner liner (3) for connection to, for example, the engine and a spring (2), fitted between casing and liner. The spring of elastomeric material is fastened at least on one side to the outer sleeve. It encloses, solidly connected, the outer circumferential surface of the liner (3). The spring is dimensioned such that it does not entirely fill the interior of the casing.

4 Claims, 1 Drawing Sheet

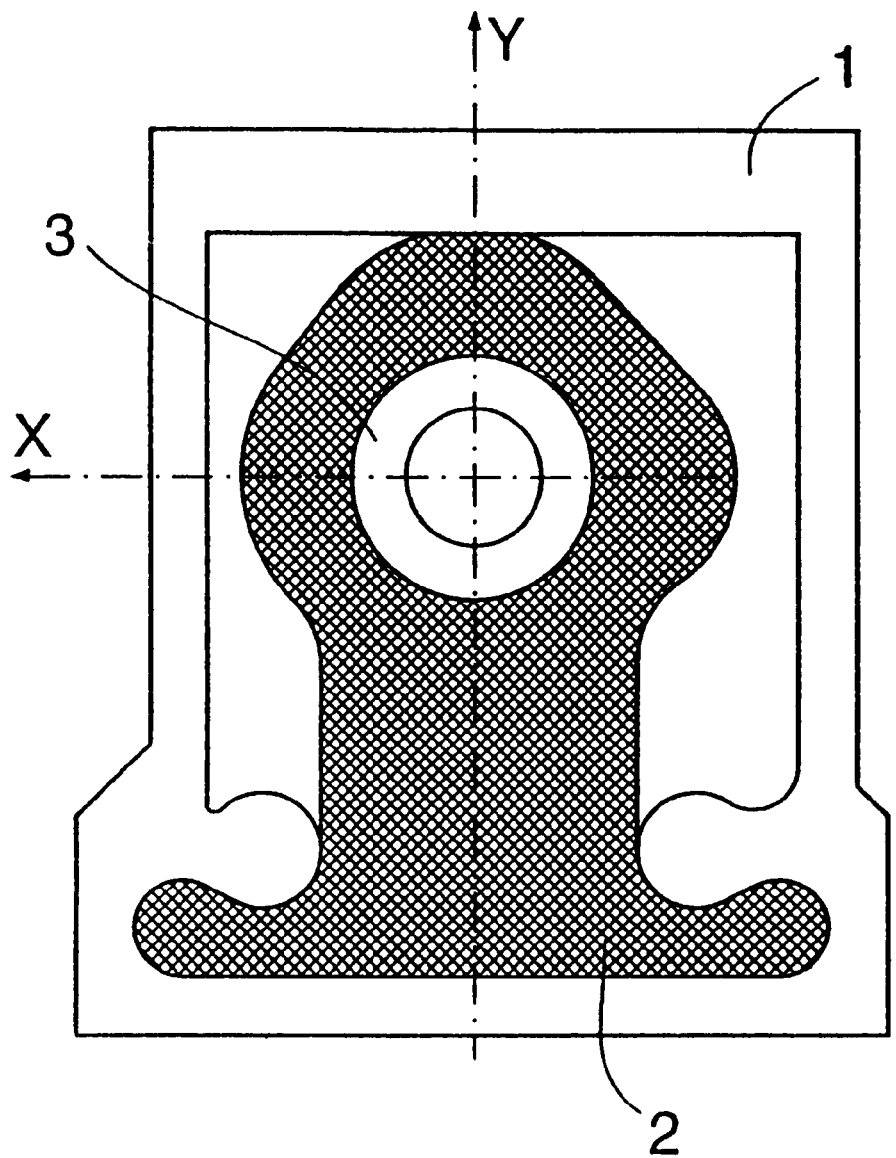

RESILIENT BEARING, IN PARTICULAR FOR MOUNTING AN ENGINE IN A MOTOR VEHICLE

BRIEF DESCRIPTION OF THE INVENTION

The invention relates to a resilient bearing, in particular for mounting an engine in a motor vehicle, having a rigid outer casing for connection to, for example, the vehicle body, a rigid liner, arranged in the casing, for connection to, for example, the engine and a spring of elastomeric material fitted between casing and liner.

Such bearings are known in a wide variety of designs. Fitted to the engine underneath as a carrying bearing, they are intended to damp the vertical movements of the engine. As a supporting bearing, fitted to the engine on top or at the side, they essentially limit the horizontal engine movements.

BACKGROUND OF THE INVENTION AND DESCRIPTION OF THE PRIOR ART

Requirements for the supporting bearings are: in the idling speed range of the engine and when traveling at a constant speed, they are to have low dynamic rigidity, in other words a flat profile of their force-deformation curve. At changing speeds, in other words when accelerating or braking the vehicle, they are to have great dynamic rigidity, in other words a steep and progressive profile of their force-deformation curve.

For this purpose, DE-A-34 37 784 proposes an engine suspension for a motor vehicle which has carrying members connected to the engine which are respectively connected to the body with an elastomeric part of a damping block interposed. In this case, the elastomeric part forms a unit with the carrying member such that the carrying member engages by a pin in a clearance in the elastomeric part, pin and carrying member being connected to each other positively and/or non-positively. Since the elastomeric part completely fills its rigid outer sleeve, its force-deformation curve only ever has a steep and progressive profile.

Another resilient bearing, in particular for the drive engine in motor vehicles, is described in DE-C-30 00 511. Here, although the rubber spring body fitted between a rigid outer sleeve and a rigid inner sleeve has additional clearances, they are entirely filled with a plastic or viscose damping material.

DETAILED DESCRIPTION OF THE INVENTION

Against this background, it is an object of the present invention to specify a resilient bearing of the type mentioned at the beginning which makes possible the desired force-deformation curve with an initially gradual, but then steep and progressive profile.

We have found that this object is achieved by the spring enclosing the liner and not completely filling the interior of the casing.

The spring does not entirely fill the casing and is connected at least on one side to the casing. The connection is non-positive or positive. On three or fewer sides, the spring is not connected to the casing.

On the sides on which it is not connected to the casing, in the required position the spring may be at a distance from the wall of the casing or bear against this wall without prestressing. The sides of the spring facing these sides of the outer casing may be of a pointed or conically tapering design.

On the sides on which it is not connected to the casing, the spring may be prestressed by choosing it to be oversized in comparison with the required dimensions of the casing. If there is a relative movement of the casing with respect to the liner, the spring then slides along the wall of the casing under the pressure-exerting force produced by the prestressing. This causes friction.

The elastomeric material of the spring may be rubber or a compact or cellular polyurethane elastomer. The latter has the advantage of having a progressive force-deformation curve under compressive stress.

The invention is explained below by means of an exemplary embodiment with reference to the drawing.

The resilient bearing comprises the outer casing (1). Internally, on its underside, the spring of elastomeric material (2) is connected to the outer casing, in this case positively. The spring encloses the inner liner (3), to which it is connected, in this case non-positively. Not shown is the solid connection of the casing to the body or the engine and the solid connection of the liner to the engine or the body of the motor vehicle.

The resilient bearing is installed in the motor vehicle in such a way that relative movements between engine and body occur mainly in the direction of the axis X. In the case of these movements, the spring is at first subjected only to bending and shearing stresses. It shows only little deformation resistance to these stresses. Thus, its force-deformation curve initially has the desired flat profile. If relative movements become greater, the lateral surfaces of the spring of elastomeric material come to bear against the insides of the casing. The spring is then also subjected to compressive stress. Its force-deformation curve thus has a steep and progressive profile. In direction Y of the resilient bearing, the spring is longer than the inside dimension of the casing before assembly of the bearing. The spring is prestressed with respect to the casing. In the case of movement of the spring in direction X, it rubs against the inner wall of the casing if there is a pressure-exerting force. This causes friction, which has the effect in the bearing of additional damping.

We claim:

1. A resilient bearing for mounting an engine comprising a rigid outer casing (1) having an outer surface and an inner surface, a rigid inner liner (3) for fastening to the engine and a spring of elastomeric material fitted between said inner surface of said casing and said inner liner, wherein at least two opposite and parallel inner surfaces are flat, said spring is firmly and securely fastened to the at least one flat inner surface and only to that surface, said spring encloses the inner liner (3) and does not completely fill the interior of said casing, said spring before assembly of the bearing being longer, in a direction perpendicular to said flat surface to which it is securely attached, than the distance from said flat surface to which it is firmly and securely fastened to the other opposite and parallel flat surface, whereby after assembly it is loaded and makes friction contact with said other opposite surface, and wherein said spring of elastomeric material firmly and securely fastened to said one flat surface is in friction contact with only said opposite parallel surface, being free of contact with any remaining inner surface.

2. The resilient bearing as claimed in claim 1, wherein the elastomeric material of the spring (2) is a rubber or a compact or cellular polyurethane elastomer.

3. The resilient bearing of claim 1 wherein the engine is in a motor vehicle and the rigid outer casing is attached to the body of the motor vehicle.

4. A resilient bearing for mounting an engine comprising a rigid outer casing (1) having an outer surface and an inner surface, a rigid inner liner (3) for fastening to the engine and a spring of elastomeric material fitted between said inner surface of said casing and said inner liner, wherein at least two opposite and parallel inner surfaces of said outer casing (1) are flat, said spring is firmly and securely fastened to only one of said opposite and parallel inner surfaces and only to that surface, said spring encloses the inner liner (3) and does not completely fill the interior of said casing, said spring before assembly of the bearing being longer, in a direction perpendicular to said flat surface to which it is firmly and securely fastened, than the distance from said flat surface to which it is firmly and securely fastened to the other opposite and parallel flat surface, whereby after assembly it is loaded and makes friction contact only with said opposite parallel surface, and wherein the spring is of a conical tapering shape toward the direction of said opposite surface.

* * * * *